United States Patent
Loetzner et al.

(10) Patent No.: US 6,694,812 B2
(45) Date of Patent: Feb. 24, 2004

(54) ROTATABLE SHAFT BALANCING MACHINE AND METHOD WITH AUTOMATIC FLEXIBLE SHAFT BALANCING EQUIPMENT

(75) Inventors: Peter Loetzner, Lake Orion, MI (US); C. Peter Hemingray, Rochester Hills, MI (US); Charles Maas, Troy, MI (US)

(73) Assignee: Schenck Rotec Corporation, Troy, MI (US)

( * ) Notice: Subject to any disclaimer, the term of this patent is extended or adjusted under 35 U.S.C. 154(b) by 0 days.

(21) Appl. No.: 10/121,533

(22) Filed: Apr. 12, 2002

(65) Prior Publication Data

US 2003/0024309 A1 Feb. 6, 2003

(Under 37 CFR 1.47)

Related U.S. Application Data

(60) Provisional application No. 60/283,516, filed on Apr. 12, 2001.

(51) Int. Cl.[7] ................................................ G01M 1/16
(52) U.S. Cl. ............................................. 73/462; 73/468
(58) Field of Search ......................... 73/460, 462, 469, 73/468

(56) References Cited

U.S. PATENT DOCUMENTS

| | | | | |
|---|---|---|---|---|
| 4,014,495 A | * | 3/1977 | Oda et al. | 228/7 |
| 5,046,361 A | * | 9/1991 | Sandstrom | 73/460 |
| 5,493,763 A | * | 2/1996 | Yamanaka et al. | 29/27 C |

* cited by examiner

*Primary Examiner*—Hezron Williams
*Assistant Examiner*—Tamiko Bellamy
(74) *Attorney, Agent, or Firm*—Reising, Ethington, Barnes, Kisselle, P.C.

(57) ABSTRACT

Machine and method for dynamically balancing rotatable shafts featuring positioning and welding equipment that is controlled by an electronic control unit that determines the imbalance of a rotating shaft and the amount of weight required at predetermined balance planes associated with misalignment joints of the shaft. The positioning and welding equipment is moved along a rail of the machine parallel with the shaft mounted therein into precision points and the welding gun moves into a welding position in which the shaft is griped by the welder and the correction weight is welded at the correction point on the shaft in the correction plane. In a second embodiment, balancing is achieved by removing calculated amount of materials at points on the shaft determined by the electronic control unit.

8 Claims, 7 Drawing Sheets

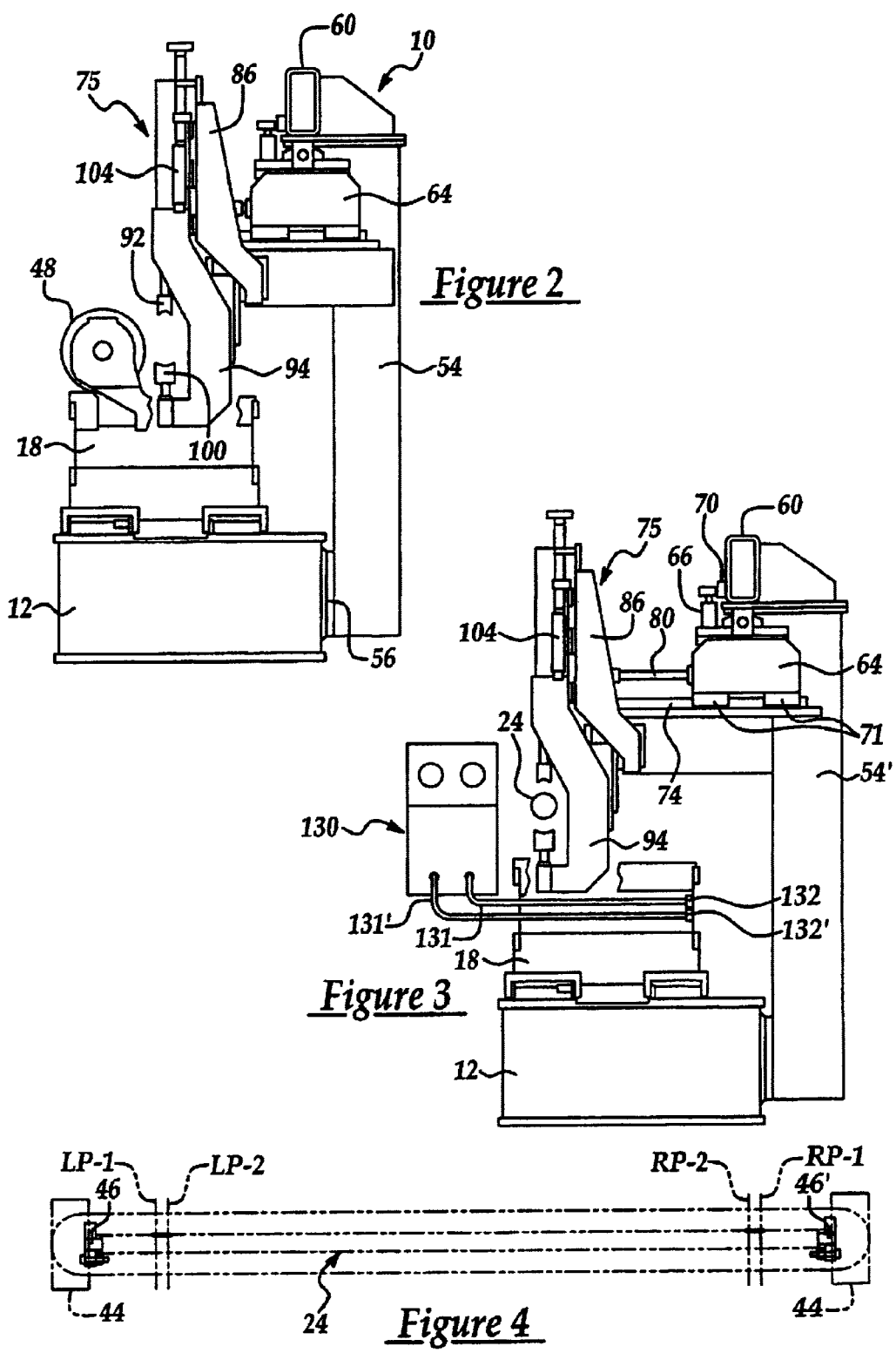

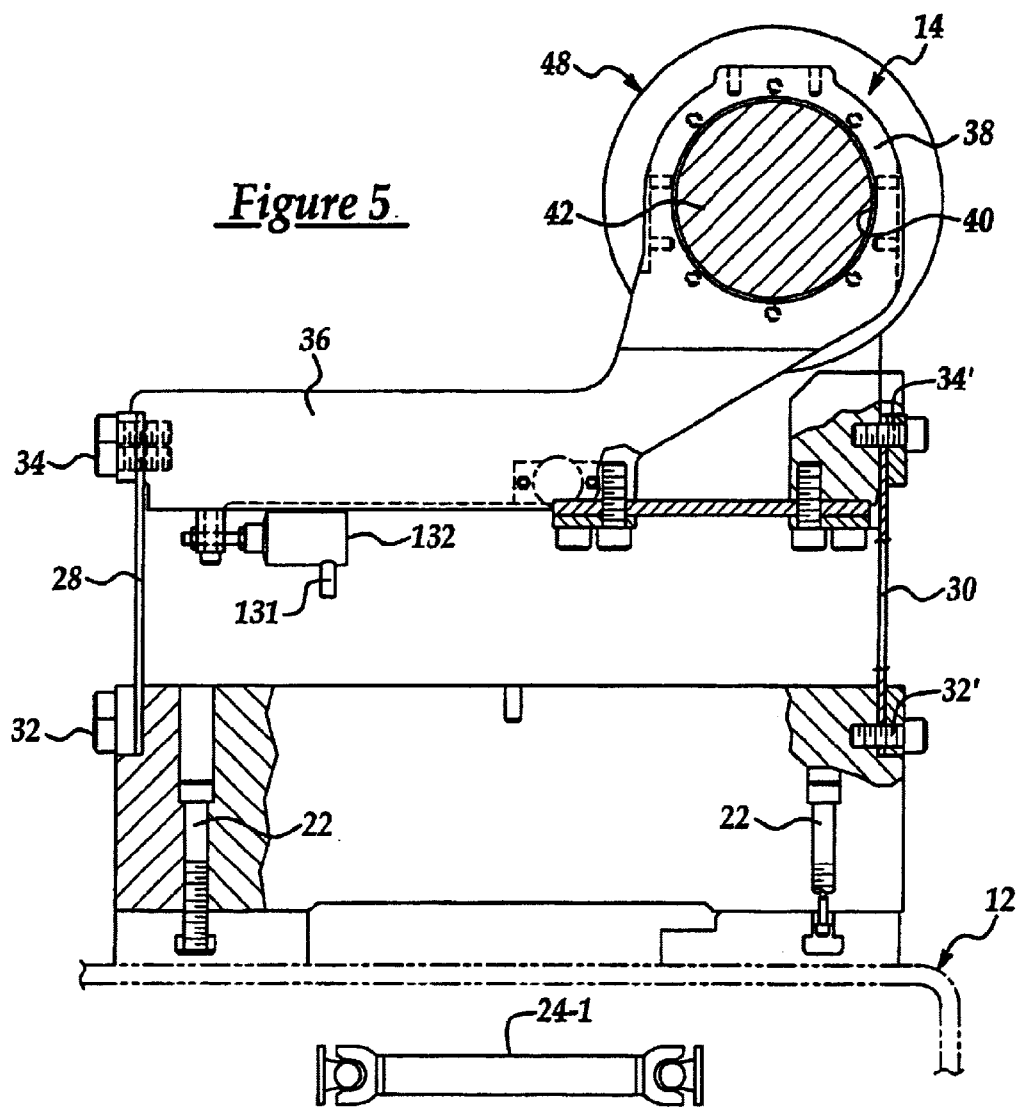
Figure 5.
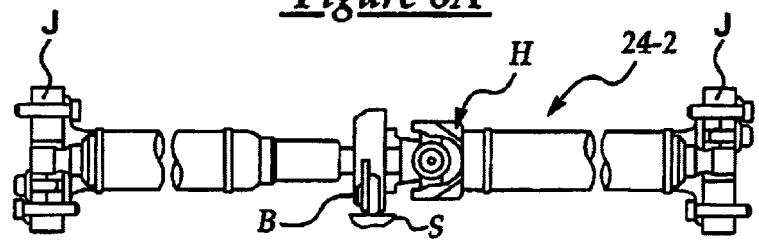
Figure 6A
Figure 6B
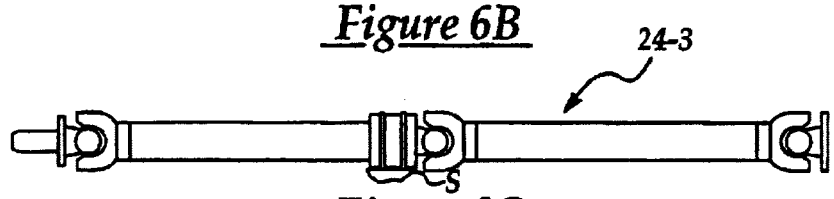
Figure 6C

ROTATABLE SHAFT BALANCING MACHINE AND METHOD WITH AUTOMATIC FLEXIBLE SHAFT BALANCING EQUIPMENT

U.S. Provisional application Serial No. 60/283,516 filed Apr. 12, 2001 is hereby cited for purposes of priority and such is claimed.

BACKGROUND OF THE INVENTION

1. Field of the Invention

This invention relates to the precise correction of imbalance of rotating shafts and more particularly to new and improved methods and machines having the capability to automatically determine the imbalance of a rotating shaft, determine the amount of weight variance needed for shaft balancing and subsequently effecting such change at precise points on the shaft in predetermined and widely varying balance-correcting planes thereof.

2. Description of Prior Art

Balancing machines with fixed weld guns for attaching balancing weights to workpieces have been devised to measure and correct for imbalance in various rotating components such as driveshafts or propshafts used in automotive vehicles. Such balancing weights are normally welded to the shafts in balancing planes associated with nearby Cardan or other misalignment joints of the shafts. Ideally, such weights are positioned to completely balance the inertia forces of the rotating shaft. Rotational balancing is needed to reduce or eliminate vibration of the mechanical system using such driveshafts to improve occupant comfort and to reduce forces on shaft bearings and other automotive components to thereby enhance the service life or durability of such equipment.

While these balancing machines have provided many important and useful benefits, they usually have one weld gun unit for each plane of correction. Generally, two weld gun units are required for weight balancing one-piece driveshafts, three weld gun units for balancing two-piece driveshafts and four weld gun units for balancing four-piece driveshafts. Each weld gun unit of the machine is manually set up to a correcting horizontal position in an associated predetermined first correction plane extending across the central axis of the driveshaft to be balanced on the machine. After the shaft is rotated and imbalance is determined, balancing weights are subsequently welded to shaft by the discrete gun units in the associated first correction planes.

If further shaft balancing is needed, each weld gun unit may be capable of limited horizontal or longitudinal adjustment restricted to a second correction plane that is only a small and predetermined distance from the first correction plane. This adjustment may automatically take place when additional weight needs to be added to the shaft in the second unbalance correction plane to balance the shaft. Such multiple guns including those with fine adjustment are expensive and add to the costs, complexity and difficulty in balancing driveshafts.

In addition to the welding of imbalance correcting weight at predetermined points in correction planes of the drive shaft for shaft balancing, the physical removal of material of the shaft by cutting or milling away portions thereof with power tooling has effectively met some shaft balancing goals. Such material removal for weight adjustment for balancing purposes of shafts such as a drive shaft is tedious and labor intensive and quite difficult to accomplish while ensuring shaft integrity.

In any event the prior equipment and processes do not meet new and higher standards for improved automatic shaft imbalance detection, mobility in positioning weld guns or weight removal equipment as well as new and higher goals for improved economy in capital equipment cost and operation, and in balanced parts produced.

SUMMARY OF THE INVENTION

This invention provides new and improved rotatable shaft balancing methods and machines featuring innovative mobile or infinitely adjustable balancing weight welding guns or shaft material removal mechanisms. The shaft balancing machines of this invention are automated and optimized for improved economy and greater flexibility in shaft balancing equipment and particularly in the extended linear mobility of such equipment. This equipment includes (1) welding guns that are automatically and precisely positioned to weld balancing weights on rotatable shafts in more than one widely-spaced balancing plane thereof and (2) material removal tools similarly positioned to eliminate unbalancing masses in the shaft at balancing planes thereof for optimizing shaft balancing.

An object, feature and advantage of this invention is to provide new and improved dynamic rotatable shaft balancing machines with flexible welding gun capability to reduce the requirements for additional welding guns married to particular welding planes.

Another object, feature and advantage of the present invention is to provide new and improved rotatable shaft balancing procedures and constructions having a wide range of weld gun movements including movements to an infinite number of horizontally-spaced, balance-correcting planes associated with the flexible or other constructions used for shaft connections and mountings and subsequently welding shaft balancing weights to the shaft at points at the balance correcting planes.

Another object feature and advantage of this invention is to provide new and improved methods and equipment for determining imbalance correction weights and positions for weight attachment for balancing rotating drive shafts and the like using at least one weight applying and welding gun for automatically welding balancing weight at varying horizontally spaced points on the shaft including points in widely spaced correction planes extending through the shaft and adjacent opposite ends thereof.

Another object, feature and advantage of the present invention is to provide new and improved methods and equipment for automatically determining, applying and welding imbalance correction weights at calculated balancing positions on a rotatable shaft at predetermined balance correction planes extending through a rotatable driveshaft assembly using only an optimal number of weld guns each automatically controlled and moved to and from positions at which such weights are welded to the shaft.

Another object feature and advantage of this invention is to provide new and improved rotatable shaft balancing methods and equipment for automatically determining the mass that has to be removed at the points on the shaft, the precise location where such mass is to be removed on a rotationally imbalance shaft and then to automatically remove such mass to effect shaft balancing.

These and other features, objects and advantages of this invention will become more apparent from the following specifications and drawings:

BRIEF DESCRIPTION OF THE DRAWINGS

FIG. 2 is an end view of the equipment of FIG. 1;

FIG. 3 is a sectional view of the equipment of FIG. 1 with added components diagrammatically illustrated;

FIG. 4 is a top view illustrating a machine-mounted drive or propshaft and the corrections planes adjacent to the ends thereof;

FIG. 5 is a cross-section al view taken generally along the sight lines 5—5 of FIG. 1;

FIGS. 6a, 6b, 6c are side views of various drive or propshafts, which may be balanced by the machine of FIG. 1;

DETAILED DESCRIPTION

Figure 1:
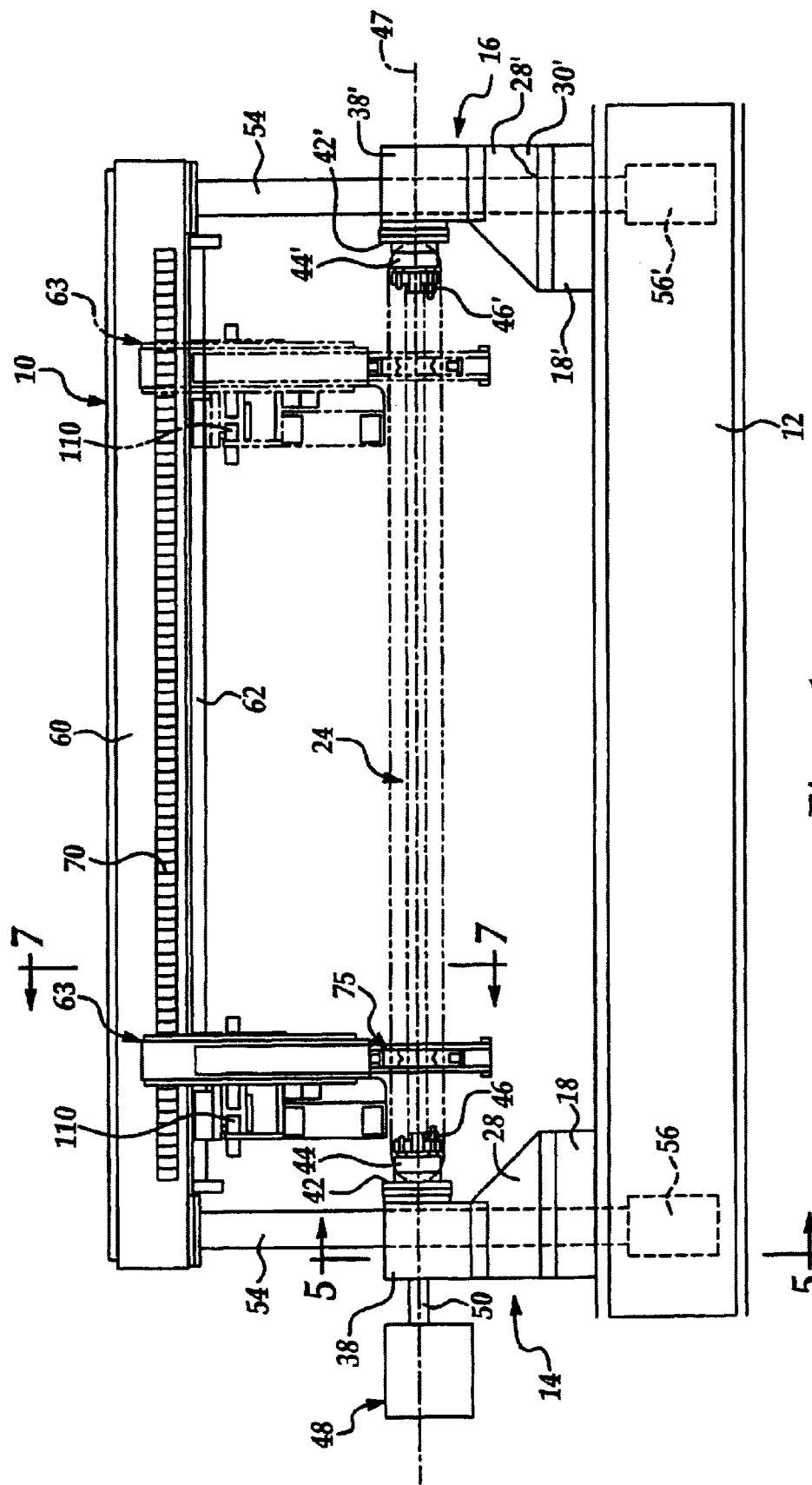
FIG. 1 is a side view of a shaft-balancing machine with a compliant weld gun assembly associated therewith.

Turning now in greater detail to the drawings, FIGS. 1–3 best illustrate a drive shaft balancing machine 10 having a supporting base 12 with laterally spaced left and right hand pedestals 14 and 16 extending upwardly from adjustable connection to the base. More particularly, the lower support block 18, 18' of at least one pedestal is adjustably secured to the supporting base at an infinite number of fixed positions such as by using suitable threaded fastening devices 22. This allows pedestal 16 for instance to be adjusted toward and away pedestal 14 to an infinite different number of relative positions to accommodate elongated driveshafts or shaft assemblies 24 of varying lengths to be mounted therebetween. These shaft assemblies generally have misalignment joints at opposite ends and may have one or more shaft segments.

Each pedestal 14, 16 has a pair of flattened, laterally-spaced supporting spring plates 28, 30 and 28', 30' extending upwardly from attachment to the lower support block by lower threaded fasteners 32, 32' into secure attachment by upper threaded fasteners 34, 34' with the base 36, 36' of spindle housing 38, 38'. Each spindle housing defines an upper cylindrical opening 40, 40' for accommodating horizontally oriented rotatable spindles 42, 42' therein.

The spindles have adjustable clamping jaws or attachment tools 44, 44' fixed at their inboard ends so that the misalignment joints 46, 46' of the elongated driveshaft 24 can be secured therein and the drive shaft can be rotatably driven about a horizontal spin axis 47 of the machine. The left-side spindle receives drive torque from a spindle drive motor 48 via a suitable drive connection 50.

In addition to the supporting the pedestals, the machine base supports a pair of spaced left and right side uprights 54, 54' extending upwardly from attachment at 56, 56' with the far side of the base and rearwardly offset from the pedestals. An elongated, tubular, upper support beam 60 extends lengthwise or horizontally over the base and is securely coupled to top end portions of the uprights 54, 54'. The beam carries a coextensive weld gun support rail 62 on the lower side thereof, FIGS. 1, 7, 7a, for a weld gun assembly 63 that includes a supporting carriage 64. The carriage of the weld gun assembly is mounted for extended horizontal sliding movement on the rail 62 by an upwardly projecting slider 65 projecting upwardly from secure connection with the carriage. With this construction, the carrier can travel smoothly along the rail. The carriage 64 of the gun assembly also supports an electric or hydraulic drive motor 66 securely mounted thereon. This motor has a pinion 68 driven by its rotatable output shaft, which meshes with the teeth of an elongated rack 70 secured to the forward face of the upper support beam 60. By computer controlled energization and operation of the drive motor in clockwise or counterclockwise directions the weld gun assembly 63 can be motor driven to an infinite number of precise positions on the weld gun support rail for weld gun positioning purposes.

The carriage 64 has lower, laterally spaced slides 71 that slidably receive a connector rail assembly 74 that extends at a right angle and outwardly with respect to the horizontally or longitudinally laterally oriented weld gun support rail 62. The connector rail assembly extends from operative connection with a connect bracket 72 frontwardly positioned weight welding gun unit 75. The carriage 64 is further provided with a power cylinder 78 operatively mounted thereon that has a hydraulic or pneumatically operated piston therein that includes a piston rod 80 whose outer end operatively mounts to the connecting bracket 82. This bracket is secured to the welding gun unit 75 as diagrammatically shown in FIGS. 2–3 and 7–7a. With this construction, the power cylinder 78 can be actuated to effect piston stroking and resultantly move the welding gun unit 75 forward or rearwardly i.e. laterally between the retracted, shaft-loading position of FIG. 2 and the forward, weight location and welding position of FIGS. 3 and 7. Shock absorber 83 cushions the engagement of the weld gun unit 75 with carriage 64 when the weld gun unit is moved to the retracted position.

Figure 7:
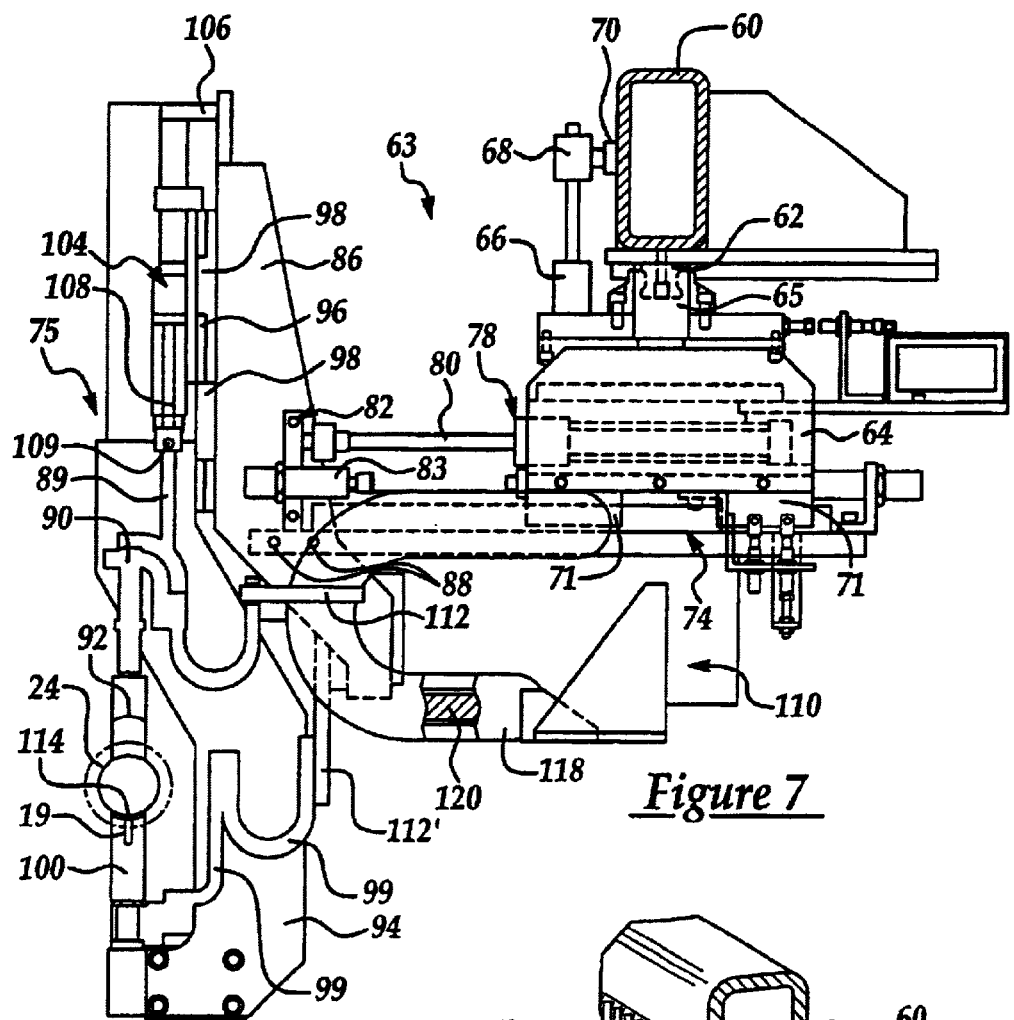
FIG. 7 is a cross sectional view taken generally along the sight lines 7—7 of FIG. 1.
Figure 7A:
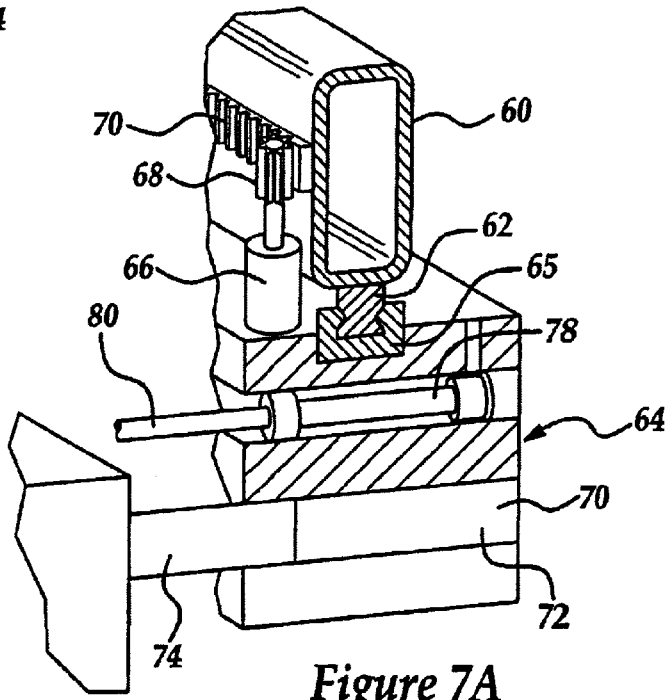
FIGS. 7a and 7b are illustrative pictorial views of parts of the welding gun assembly of the machine of FIG. 1.
Figure 7B:
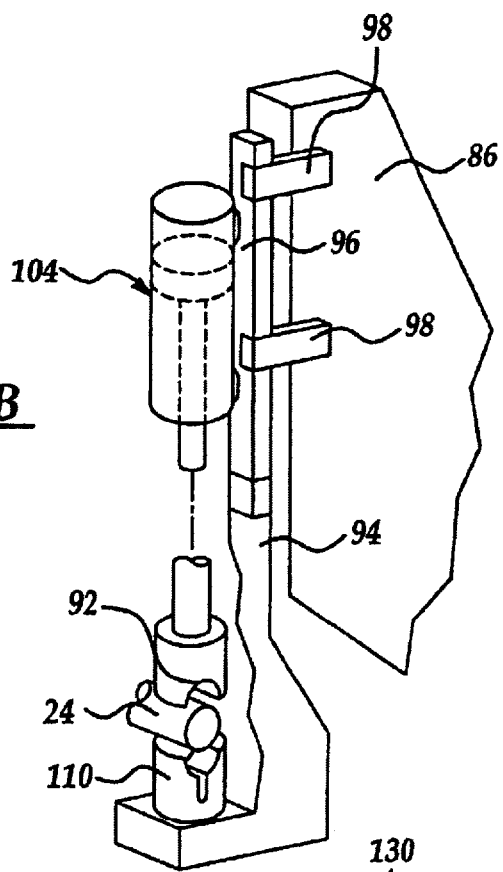

One preferred embodiment of the welding gun unit 75 includes a vertically extending support arm 86 which is secured by suitable connectors 88 to the outer end of the linearly movable support and connector rail assembly 72. The upper support arm 86 of the welding gun unit connects to bracket 82 for fore and aft movement. This arm further has a vertical slide connection with the body of a power cylinder 104. The cylinder has a vertically stroking piston rod extending therefrom. The piston rod has its outer end connected with an electrode support 89 that operatively carries upper electrode 90. As illustrated upper electrode 90 terminates in a shaft contact 92 that extends downwardly and is capable of operative contact with the outer periphery of the drive shaft 24 for resistance welding purposes The support arm 86 also operatively mounts a lower gun arm 94 by a rail and slide connection. This connection comprises a vertical rail 96 extending from fixed attachment with the body of the power cylinder into a linear sliding fit with vertically spaced slides 98 that project from the support arm 86 as illustrated in FIG. 7. The lower gun arm 94 carries a lower electrode 99 which may have a curved connecting body portion that terminates in an supporting end portion that carries a lower shaft electrical contact 100 that is spaced from and aligned with the upper electrical contact 92 to engage the shaft for resistance welding balancing weights for resistance welding of metallic weights or slugs to the shaft for shaft balancing.

The upper and lower electrodes and opposing shaft contacts are relatively moved in a vertical direction, as a pair of opposing force applying jaws that open and close with respect to shaft 24 the operation of a hydraulic or pneumatically operated self-equalizing power cylinder 104. The body of the power cylinder 104 is secured to the upper end of the gun arm 94. The power cylinder 104 further has a conventional piston and piston rod assembly operatively mounted therein with the piston rod 108 thereof connected at its outer end by a pivot pin 109 to the electrode support 89 and its electrode 90.

The weld gun assembly 63 has an electrical transformer 110 associated therewith which is supported on the carriage and can be electrically energized to provide the large welding current through a secondary circuit of the welding gun assembly. This circuitry includes bus bars 112, 112' the upper and lower electrodes 90, 99 and their shaft contacts as well as the metallic balancing weight or slug 114 operatively fed to the appropriate contact of the weld gun unit by a pneumatically operated balancing weight cut and feed unit 116 with weight cutting tool 116', diagrammatically shown in FIGS. 8, 8b that is operatively mounted on the carrier. After being precisely cut by the unit to a calculated weight, the slug or balancing weight 114 is supplied to a pick up point and is picked up by one of the contacts 92 or 100 of the welding electrodes. The balancing weight 114 is maintained in a seated position on the contact by a permanent magnet 117 provided in the contact until it is resistance welded in a shaft balancing position on the shaft 24. Cable track 118 routes the electrical conductor cable 120 from the transformer into operative connection with the electrical conducting components of the weld gun assembly.

FIGS. 4, 6a, 6b and 6c illustrate a few examples of drive shafts that can be rotationally balanced by the machine 10. The drive or prop shaft 24 of FIG. 4 can be readily mounted by the misalignment joints 46, 46' secured in opposite ends thereof into the opposing attachment tools 44, 44' of the machine. Also identified in FIG. 4 are left and right side first correction planes or zones LP-1 and RP-1 adjacent opposite ends of the shaft and the respective misalignment joints 46, 46'. Additionally left and right side second correction planes or zones LP-2 and RP-2 laterally offset from the respective first correction zones are shown. These planes are predetermined and are spaced from given points of the misalignment joints and are programmed into the Electronic Control Unit or ECU 130 so that no particular physical markings of the planes on the shaft being balanced are required for balancing purposes.

FIG. 6a illustrates a single-piece, fixed-length tubular shaft 24-1 with Cardan or Hooke joints at opposite ends thereof. FIG. 6b illustrates a multi-segment shaft 24-2 with flexible joints J at opposite ends thereof, a center bearing B and an intermediate Hooke joint H connecting the segments. An intermediate pedestal support is needed for center bearing support with vibration pick up for computerized balancing operation for such multi-segment shafts. FIG. 6c illustrates another two piece shaft 24-3 with U-joints at opposite ends thereof and one joint operatively connecting the two pieces or segments of the shaft 24-3. The machine 10 balancing of the shaft of FIG. 6b or 6c requires a minimum of three balance planes, one adjacent to each of the joints. An intermediate pedestal will be needed for support of the intermediate bearing support of the shaft. Four balancing planes are required for a three-piece drive shaft one for each joint including planes near the joints connecting the segments to one another. Accordingly, this invention can also incorporate two or more automatically positioned weld gun assemblies such as weld gun assembly 63 for improving welding output and shaft balancing.

Figure 8:
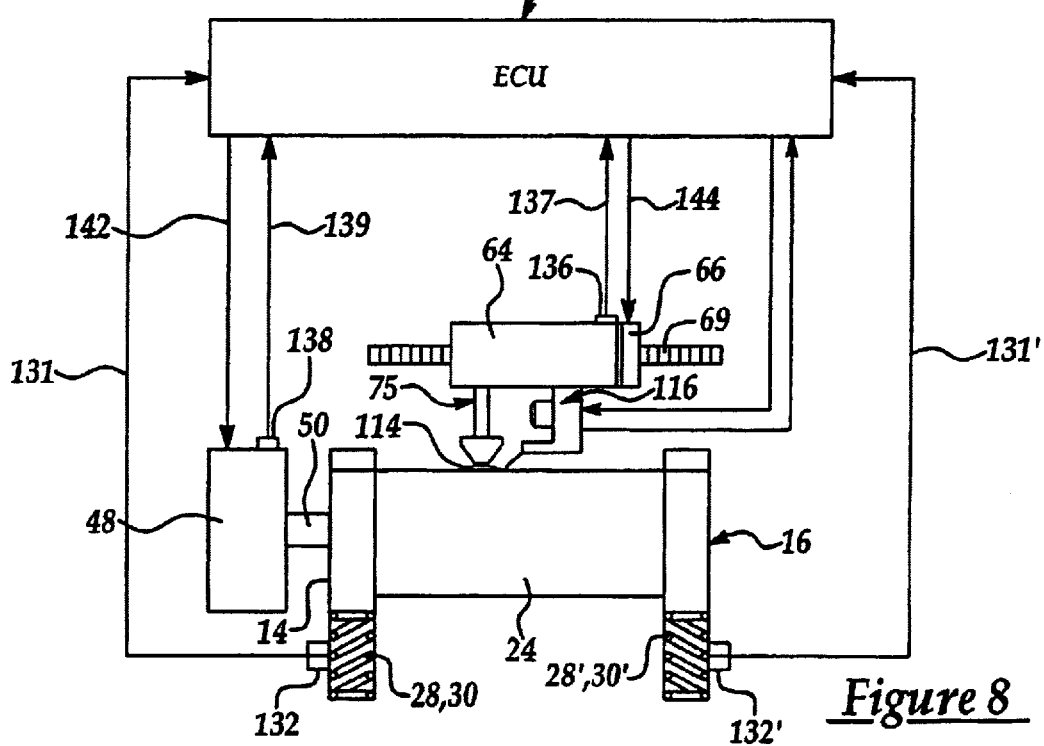
FIG. 8 is a diagram illustrating operation of the machine and the welding of imbalance correcting weights on the shaft in accordance with one aspect of the present invention.
Figure 8A:
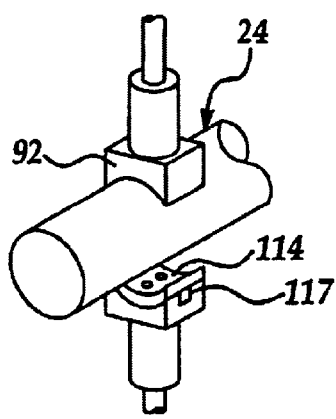
FIGS. 8a and 8b are respectively illustrative pictorial views of welding electrodes welding a balancing weight to a drive shaft and of a strip feeder feeding and cutting balancing weights for the welding gun assembly of this invention.
Figure 8B:
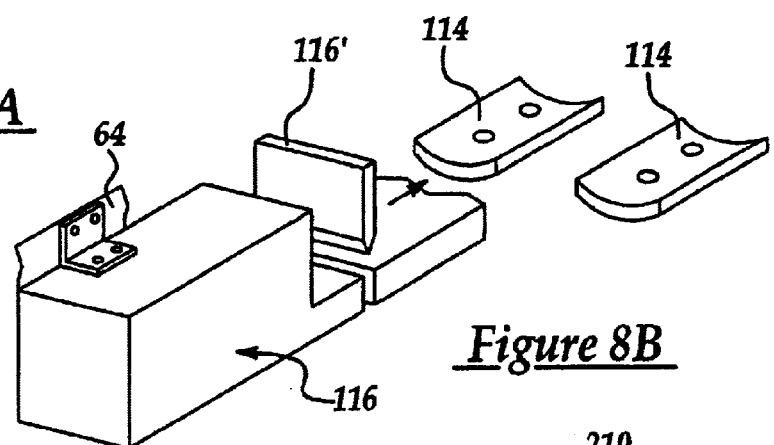

FIGS. 3 and 8 diagrammatically illustrate the electronic control unit (ECU) 130 programmed to calculate balancing weights and weight attachment points on a drive shaft being balanced. After a drive shaft, such as shaft 24 for example, is loaded into machine 10, the machine is started to effect the rotational drive of the shaft and the automatically sequenced balancing operations. Initially the electronic control unit 130 is fed with shaft balance data through balance data lines 131, 131' leading from vibration sensors 132, 132' mounted on the palates 28, 30 and 28', 30' or mounted to the spindle base 36 as shown in FIG. 5. The ECU calculates the balance weight required as well as the precise horizontal and angular positions on the shaft for balancing weight attachment that will be in the predetermined correction planes.

The ECU is further supplied with weld gun position data from a gun position sensor 136 mounted on the carriage 64 and connected to the ECU by weld gun position sense line 137. The ECU supplies weld gun position control signals through line 144 that connect to the weld gun position motor 66. The power cylinders 78 for moving the weld gun unit between the retracted loading position of FIG. 2 and the advanced balance determining and welding of calculated balance weight to the shaft are also controlled by the electronic control unit.

The rotational position of the drive shaft 24 is supplied to the ECU by shaft position sensor 138 and shaft angle position line 139 mounted to the output of motor 48 or spindle 42.

Shaft position control signals are fed from the ECU to the motor 48 to rotate the shaft to the calculated angular position through line 142. The horizontal or longitudinal position of the welder for shaft balancing is controlled by the ECU through connecting line 144 to energize the carriage positioning motor 66 for controlled clockwise or counterclockwise operation.

For automatic measuring and imbalance correcting operation, a driveshaft such as single piece fixed length driveshaft 24 can be readily loaded into the machine 10 as illustrated in FIG. 1. The machine is activated and the unbalance of the driveshaft is measured by the electronic control unit 130. The first correction plane weights 114 are determined by ECU operation and a first of these balancing weights are selected from a supply of weights or is cut to size and presented to the weld gun unit or tooling 75 by strip feeder 116 with cutting tool 116. The weld tooling under ECU control signals automatically moves longitudinally and laterally to the proper correction plane position such as LP-1 for example. The shaft 24 may be turned to a particular angular orientation by the motor 48 energized from signals from the ECU for precision placement of the balance weight on the shaft. With the balancing weight precisely positioned on the shaft and the held under predetermined load by the closing action of the welder jaw arms, the welding gun circuitry is energized and the first balancing weight 114 is resistance welded to the driveshaft.

The right side correction plane weight 114 has also been calculated by the electronic control unit and is by control signals from the ECU selected or cut to size by the strip feeder 116 and its cutting tool 116', and presented to the weld tooling. The ECU controlled weld tooling then automatically traverses horizontally on the rail 62 and subsequently the weld gun is moved laterally by the stroke of the power cylinder to the proper correction plane position. The shaft 24 is again angularity positioned and the jaws of the are closed by action of power cylinder 104 so that the right side balancing weight 114' is held against and resistance welded to the prop-shaft at the calculated balance position. Additional correction plane weights are applied and welded in the planes LP-2 and RP-2 if required and particularly on multi-piece prop-shafts such as in FIGS. 6b and 6c. The unbalance of the driveshaft is audited. The correction process may be repeated if necessary to attain the balance specification for the driveshaft. Any residual unbalance position is marked on the prop-shaft. The weld tooling automatically moves clear of the driveshaft to provide unloading clearance. The operator unloads the driveshaft from the balancing machine and the machine 10 is ready for receiving and automatically balancing another driveshaft.

For a two weld gun machine balancing a two piece shaft the operator loads a driveshaft in the balancing machine and the machine is cycled to rotatably driveshaft to a predetermined rpm, and the first correction plane weight is determined and weight position calculated. Responding to information fed from the ECU, the balancing weight is selected or cut to size by the strip feeder 116, and presented to the welder tooling. The weld tooling under control of the ECU automatically moves longitudinally and laterally to the proper correction plane position. The driveshaft which was stopped after the initial shaft balance calculations is turned by the motor 48 under control from ECU signals to a calculated angular position for procisioned positioning of the balancing weight. The first weight is welded to the driveshaft at a precise point on the periphery of the shaft at the first correction plane. The second correction plane weight is similarly determined, selected or cut to size, and presented to the second weld gun tooling. The second weld tooling is again automatically moved longitudinally and laterally to the proper correction plane position. The second weight is welded to the prop-shaft. This action preferably occurs, except for the welding, while the first weld gun is operating.

The third correction plane weight is determined by the ECU and the strip feeder is signaled by the ECU and the calculated weight is, selected or cut to size, and presented to the weld tooling by the strip feed unit. Under ECU control the first weld gun tooling automatically moves longitudinally and laterally to the proper correction plane position. The third weight is welded to the prop-shaft. The third correction operation occurs, except for the welding, while the second gun is operating to improve efficiency. The unbalance of the driveshaft is there audited by the machine through the ECU. The correction process is repeated if necessary to attain the balance specification for the prop-shaft. The residual unbalances position if any may be marked on the driveshaft. The weld tooling automatically moves clear of the prop-shaft to provide unloading clearance. The operator unloads the dynamically balanced two piece prop-shaft from the balancing machine and the machine is clear for another shaft balancing operation.

Figure 9:
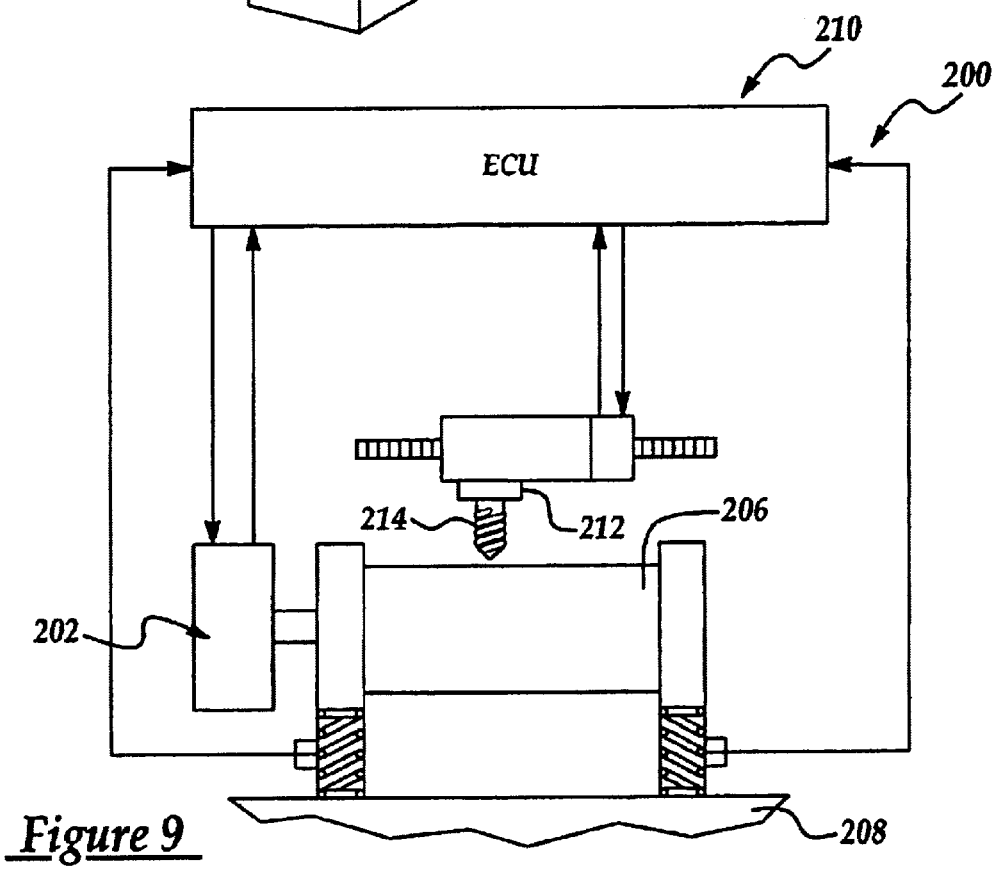
FIG. 9 is a diagram illustrating a second embodiment of the invention.
Figure 10:
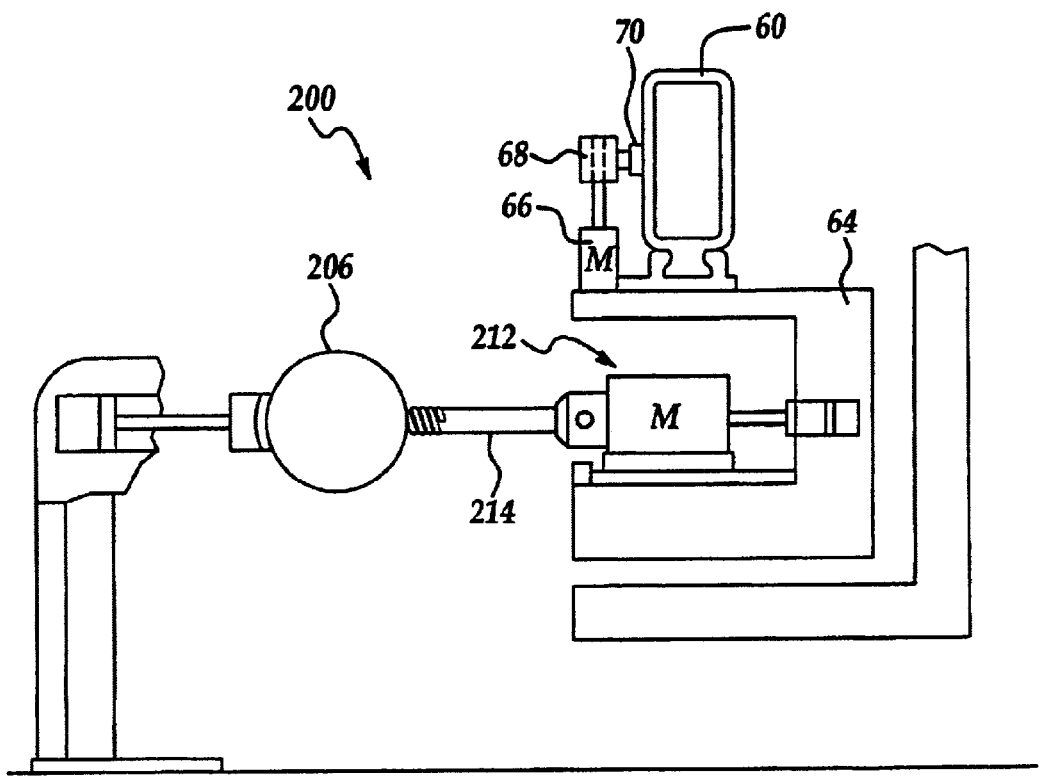
FIG. 10 is a diagrammatic cross-sectional view of the second embodiment of the invention.
Figure 11A:
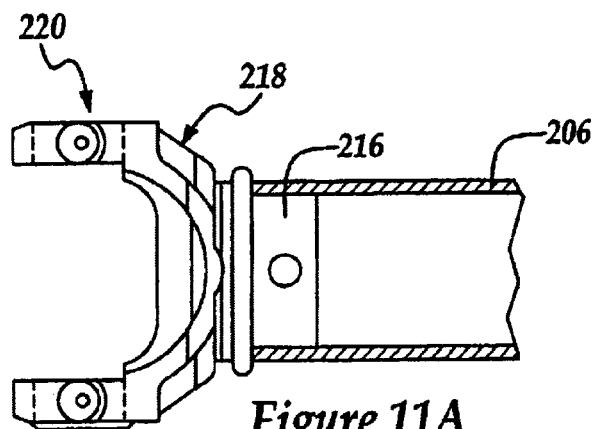
FIGS. 11a and 11b are pictorial views illustrating parts of a drive shaft balanced by the second embodiment of this invention.
Figure 11B:
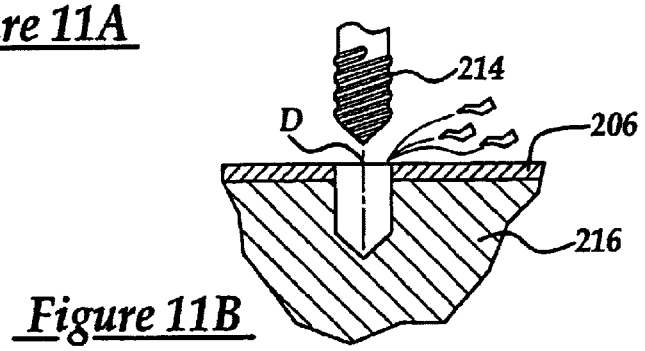

A second embodiment of the invention is diagrammatically illustrated in FIGS. 9–11b. In FIG. 9, a shaft-balancing machine 200 is the same as machine 10 of the first embodiment. Except that instead of employing a welding tool that adds balancing weight to calculated points on a driveshaft, a material removal tool such as a milling machine or drill is employed to remove material from the shaft for balancing. The removal tool is under control of an electronic control unit is precisely positioned by the machine and futher is operated to remove quantities of material from the shaft to effect precision balancing.

As in the first embodiment the machine 200 has a drive motor 202 that rotates a drive shaft 206 releasably secured by clamping jaws which are operatively supported in the pedestals supported on machine base 208. As in the first embodiment of FIGS. 1–8 the second embodiment utilizes an electronic control for weight calculations but the ECU 210 of the second embodiment with operational inputs from pickups of the balancing machine calculates the amount of weight to be removed from points on the shaft 206. The points are in the right and left side correction planes near the misalignment joints as in the first embodiment. A drilling or milling unit 212 is automatically traversed and positioned at points on the shaft in the correcting planes LP-1 and LP-2 in FIG. 4 for example. The drill unit 212 being automatically and precisely positioned is activated to drive the milling or drilling tool 214 to bore the horizontally spaced openings to calculated depths, such as depth D in the shank 216 of the yoke 218 of the misalignment joint 220 friction welded to the end of the tubular body of the shaft to remove calculated quantities of material and thereby effect shaft balancing.

It should be noted that the above method steps are presented as preferred steps and that a variety of others will be apparent to those skilled in the art. Also, the present invention may be used in a variety of different constructions encompassing many alternatives, modifications, and variations that are apparent to those skilled in the art. Accordingly, the present invention is intended to embrace all such method steps and such alternatives, modifications, and variations as fall within the spirit and scope of the appended claims.

What is claimed is:

1. A method for automatically and dynamically balancing elongated torque-transmitting shafts each having misalignment joints operatively affixed to opposite ends thereof that establish balancing planes extending therethrough near said joints and rotatable about a centralized axis of rotation with a balancing machine having a drive motor and a programmed shaft balance computer unit operatively associated with said machine for determining the imbalance of said shaft and the discrete weight and weight attachment positions on said shaft to effect the dynamic rotational balancing thereof and further having a weight welding unit comprising the steps of: selecting and operatively loading one of said shafts in the balancing machine, powering said drive motor to operatively drive said shaft about said axis of rotation, detecting the amount and position of rotational imbalance of said shaft in relationship to both of said balancing panes thereof and supplying data of such imbalance to said balance computer so that said computer can calculate the balance correcting weight to be affixed to the shaft in both of said predetermine correction planes to effect the rotational balancing of said shaft, supplying such balance correcting weight to said welding unit, displacing said welding unit by control of said computer and moving it to a first of the correction planes, welding first imbalance correction weight directly onto the surface of the shaft at said first correction plane, subsequently effecting the movement of said welding unit as directed by said computer to said second correction plane and welding second imbalance correcting weight to the surface of the shaft at said second correction plane to thereby correct the rotational imbalance of said shaft.

2. A method for automatically and dynamically balancing an elongated and generally cylindrical drive shaft having misalignment joints affixed to the opposite ends thereof in a drive shaft balancing machine having a weight attaching welding tool and a balance computer associated therewith, comprising the steps of: establishing predetermined balance correcting planes extending diametrically across said drive shaft at predetermined locations near the misalignment joints thereof, loading said drive shaft in said drive shaft balancing machine and operating said machine to rotatably drive said shaft, employing said computer to simultaneously calculate the rotational imbalance of said drive shaft in relation to said first and second correction planes, determining discrete first and second plane correction plane weights required to effect the rotational balancing of said drive shaft and supplying the discrete weights to said welding tooling, effecting movement of the weld tooling in lateral and longitudinal directions to an appropriate position in said first correction plane position, welding the first correction plane weight to the periphery of the drive shaft, subsequently moving said welding tooling to said second plane and then into a translatory movement into a welding position and welding said second correction plane weight to the surface of said shaft in said second plane to thereby complete an initial dynamic rotational balance of said shaft, rotatably driving the shaft and again measuring an imbalance of said shaft in said first and second planes, correcting any rotational imbalance remaining in said shaft and removing said shaft from said machine when the rotational imbalance has been corrected.

3. A machine for automatically dynamically balancing an elongated, torque-transmitting, power shaft having misalignment joints at opposite ends thereof and rotatable about a centralized axis of rotation, said machine having a drive motor and laterally spaced shaft mounting units for receiving said misalignment joints and operatively holding said shaft in said machine for rotation about said axis of rotation, a programmed balancing computer for determining the rotational imbalance of said shaft when rotatably driven in said machine and for determining the weight and weight attachment points to be applied to the shaft in balancing planes associated with each of said misalignment joints in laterally spaced balancing planes extending through the shaft at positions adjacent to said misalignment joints, a support rail substantially coextensive with and parallel to said shaft mounted in said machine, an carriage movable to an infinite number of locations along said supporting rail, a balancing weight welding tool operatively supported on said carriage, a drive mechanism controlled by said balancing computer and operatively mounted between said carriage and said support rail for operatively moving and positioning said welder to calculated positions adjacent to opposite ends of said shaft and said balancing planes so that said welder can weld balancing weights directly to said shaft at predetermined points in said balancing planes to effect the dynamic balancing of said drive shaft.

4. A balancing and welding machine for automatically rotationally driving and balancing an elongated torque-transmitting shaft rotatable about a central axis and having opposite ends with misalignment joints affixed thereto to establish correction planes extending transversely thorough said opposite ends comprising a base, left and right side pedestals located at opposite ends of said base, a welding tool for welding balancing weights to said shaft, a carriage for said tool, each of said pedestals having spindle housing secured at an upper end portions thereof, a spindle rotatably mounted in each housing, a shaft attachment device secured to the facing ends of said spindles for attaching opposite end portions of said torque-transmitting shaft, a motor for rotatably driving said spindles and said torque-transmitting shaft held therebetween for rotation about said rotational axis, and a drive mechanism for moving said carriage supported welding tool to a plurality of predetermined and laterally spaced positions including end positions defined by said correction planes for welding balancing weights directly to said shaft and a programmed computer for calculating balancing weights and weight attachment points on a shaft operatively mounted and driven in said machine, and pick up sensors operatively connected to said housing and said motor and to said computer for detecting the amount and position of rotational imbalance of said rotatably driven shaft in each of said correction planes so that said computer can effect movement of said carriage and said welding tool to said positions to weld said balancing weights to said shaft.

5. The machine of claim 4, wherein said drive mechanism comprises a motor mounted on a carriage of said welder, a pinion gear driven by said motor and an elongated rack with gear operatively meshing with said pinion gear and a support beam for supporting said rack gear and slidably supporting said carriage.

6. A method for dynamically balancing an elongated shaft having opposing ends and misalignment joints affixed thereto and rotatable about a centralized axis of rotation utilizing a balancing machine having a drive motor and a programmed electronic control unit operatively associated with said machine for determining the imbalance of the rotating shaft and the discrete weight varying positions on said shaft for said weights and a single weight varying unit comprising the steps of: establishing weight correction balancing planes adjacent to each of said joints of said shaft, loading said shaft in the machine and rotatably driving said shaft about the axis of rotation, determining the rotational imbalance of said shaft and storing the imbalance data in said electronic control unit, determining the balance correcting weight to be varied to the shaft in each of said predetermined correction planes, moving the weight varying unit to a first of the correction planes, operating the unit to make first imbalance weight correction to the shaft at a first correction plane, moving said weight varying unit to another correction plane and operating the unit to make second imbalance correcting weight correction to the shaft at a second correction plane to thereby correct the rotational imbalance of said shaft.

7. The method of claim 6 in which said weight varying unit comprises a metal cutting tool for removing predetermined masses of material from said shaft to correct rotational imbalance of said shaft in each of said planes.

8. A method for dynamically balancing an elongated and generally cylindrical drive shaft having misalignment joints affixed to the opposite ends thereof utilizing a shaft balancing machine having laterally splaced drive spindles with attachment tools for securing the drive shaft being balanced and rotatable about a centralized axis of rotation comprising the steps of: establishing at least two predetermined balance correcting planes extending diametrically across said drive shaft respectively adjacent to said misalignment joints, loading said drive shaft into said balancing machine and rotatably powering said machine and said drive shaft operatively mounted therein, measuring the imbalance of said drive shaft in relation to each of said correction planes, determining the balancing weights necessary for said first and second correction, effecting movement of said welding tooling in a longitudinal and then in a lateral direction to a first weight apply position in said first correction plane position, welding the first correction plane weight to the periphery of said drive shaft, linearly moving the welding gun to said second plane and then in a lateral direction to a weight to the surface in said second correction to thereby effect the dynamic rotational balancing of said drive shaft.

* * * * *

UNITED STATES PATENT AND TRADEMARK OFFICE
CERTIFICATE OF CORRECTION

PATENT NO. : 6,694,812 B2
DATED : February 24, 2004
INVENTOR(S) : Peter Loetzner, C. Peter Hemingray and Charles Maas It is certified that error appears in the above-identified patent and that said Letters Patent is hereby corrected as shown below:

Column 8,
Line 49, after "balancing" delete "panes" and insert -- planes --.

Column 9,
Line 41, after "machine," delete "an" and insert -- a --.
Line 56, after "transversely" delete "thorough" and insert -- through --.

Column 10,
Line 47, after "laterally" delete "splaced" and insert -- spaced --.

Signed and Sealed this

Fifteenth Day of June, 2004

JON W. DUDAS
*Acting Director of the United States Patent and Trademark Office*